Patented June 17, 1924.

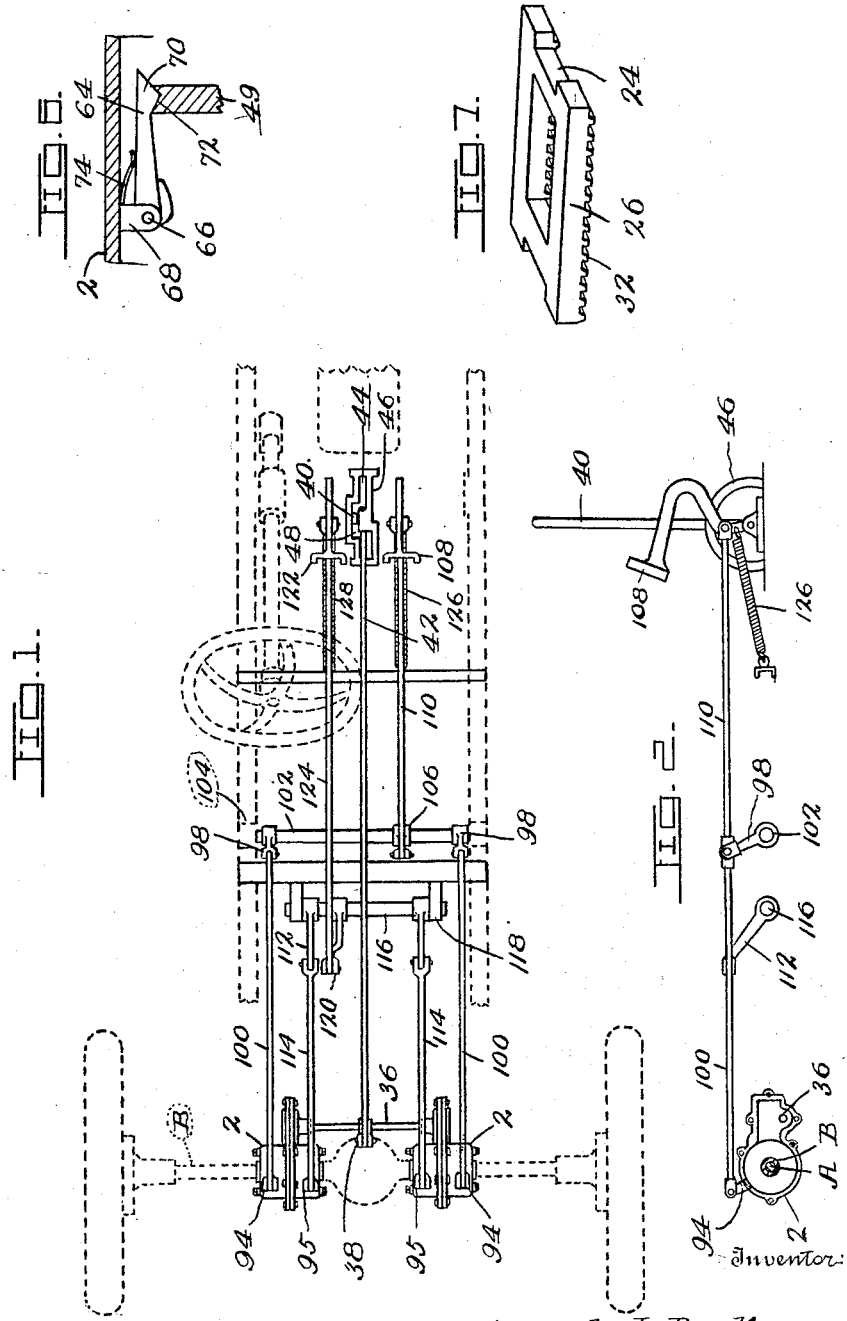

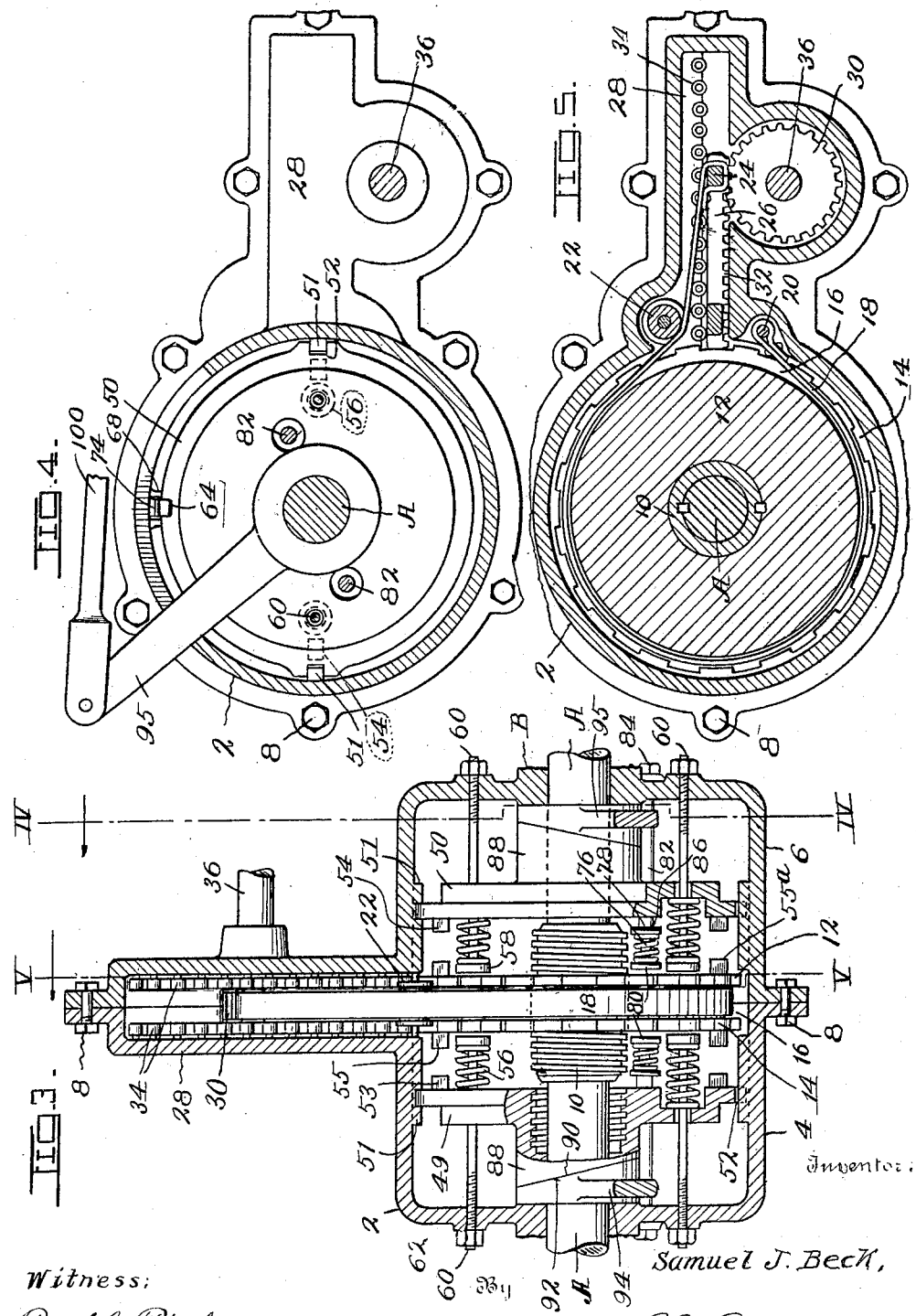

1,497,833

UNITED STATES PATENT OFFICE.

SAMUEL J. BECK, OF KANSAS CITY, MISSOURI.

AUTOMOBILE BRAKE.

Application filed May 18, 1923. Serial No. 639,794.

*To all whom it may concern:*

Be it known that I, SAMUEL J. BECK, a citizen of the United States, residing at Kansas City, in the county of Wyandotte and State of Kansas, have invented certain new and useful Improvements in Automobile Brakes, of which the following is a specification.

My invention relates to brakes which may be used to advantage on hoisting engines and other machinery, but in the present instance I have shown it applied to the rear axle of a motor vehicle.

Certain objects are to provide a brake which when installed on the rear axle of a motor vehicle may be used as a service brake to gradually stop the vehicle, and used as an emergency brake to positively stop the vehicle.

A further object is to provide a brake embodying mechanism for locking the rear axle and thus guarding against theft of the vehicle.

Other objects will hereinafter appear, and in order that the invention may be fully understood, reference will now be had to the accompanying drawings, in which:

Fig. 1 shows the brake applied to the rear axle of a motor vehicle.

Fig. 2 is a side elevation of some of the parts disclosed by Fig. 1.

Fig. 3 is an enlarged sectional plan view of one of the units of the brake.

Fig. 4 is a longitudinal section on line IV—IV of Fig. 3.

Fig. 5 is a longitudinal section on line V—V of Fig. 3.

Fig. 6 is a fragmentary detail showing a safety latch and associate parts.

Fig. 7 is a detail perspective view of a bolt employed in carrying out the invention.

Referring now in detail to the various parts, A designates the two sections of the rear axle, each being equipped with one of the units of the brake and since said units are alike only one will be described in detail. Each unit consists of a housing 2 which may be either formed integral with or bolted to the rear axle housing B, as preferred. The housing 2 is preferably, made in halves removably connected by bolts 8, so that they can be taken apart to gain access to the interior mechanism.

Each axle section A is provided with a fixedly-mounted externally threaded member 10 arranged within the respective housing 2 and carrying a fixedly mounted brake-drum 12 having peripheral recesses 14, for a purpose which will hereinafter appear. The brake-drum 12 has a peripheral groove 16 in which a brake-band 18 is operably arranged. One end of the brake-band 18 is connected to a pin 20 arranged within the housing 2, while its opposite end extends beneath a flanged guide roller 22 and is connected to the forward transverse member 24 of a bolt 26, slidably arranged within a forward extension 28 of said housing 2 and adapted to enter any one of the recesses 14 to lock the brake drum 12 from rotation.

The brake-drum 12, the brake-band 18, and the controlling mechanism hereinafter described of said brake-band 18, are employed in the same manner as the usual service brake, while said brake-drum 18, the bolt 26, and the controlling mechanism for said bolt 26 may be employed to lock the vehicle against theft, as will hereinafter appear.

The bolt 26 is moved in and out of engagement with the recessed periphery of the brake-drum 12 by a pinion 30 and rack teeth 32, which latter are formed integral with the underside of said bolt 26. Antifriction rollers 34 are mounted in the extension 28 to retain the rack teeth 32 in mesh with the pinion 30 and reduce the friction incident to the operation of said bolt 26. The pinions 30 of both housings 2 are mounted upon a single transverse rock shaft 36 provided with a fixedly-mounted crank 38 connected to a lever 40 through the intermediacy of a connecting rod 42. The lever 40 is preferably in the form of a hand lever arranged within convenient reach of the driver and operates in the slot 44 of a segment 46.

The slot 44 has a neutral point 48, so that when the lever 40 is adjusted to said neutral point 48 the driver may know that the brake-bands 18 and the bolts 26 are disengaged from the respective drums 12. When the lever 40 is pulled backwardly towards the rear end of the slot 44, it, through the intermediacy of the intervening mechanism, throws the bolts 26 into one set of recesses 14 of the respective brake-drums 12, and secures the same, with the axle sections A from rotation in either direction. The lever 40 may then be secured with a suitable lock (not shown) to protect the vehicle against theft. When the lever 40 is thrown forwardly in the slot 44 beyond the neutral point 48, it, through the intervening mechanism, causes the brake-band 18 to frictionally engage the brake drum 12 and thus gradually retard or check the vehicle in the manner of the ordinary service brake.

Referring now more particularly to what I term the emergency portion of the brake mechanism whereby the vehicle may be positively stopped in the event that the brake-bands 18 should fail to check the rotation of the drums 12, 49 and 50 designate a pair of internally threaded nonrotatable members arranged within each housing 2 at opposite sides of the respective externally threaded member 10 and loosely mounted upon the associate axle section A. Each member 49, 50 is, preferably, in the form of a disk which is held from rotation with the respective axle section A by slideways 51, formed integral with or otherwise fixed to the interior of the housing 2 and extending through oppositely-disposed recesses 52 in the members 49, 50. The members 49, 50 have laterally projecting lugs 53 and 54, for coengagement with corresponding lugs 55 and 55ª, respectively, on opposite sides of the brake-drum 12 to positively check the same from rotation, as will hereinafter appear.

The members 49, 50 are normally and yieldably held out of engagement with the associate member 10 by coil springs 56 interposed between said members 49, 50, and the heads 58 of rods 60 extending loosely through the adjacent sides of the housing 2, so that they may be adjusted longitudinally to regulate the compression of the springs 56. After being adjusted the rods 60 are locked from accidental movement by nuts 62.

The members 49, 50 are also normally held out of engagement with the associate threaded member 10 by safety devices in the form of latches 64 connected at one end by pivots 66 to lugs 68 on the interior of the housing 2. The free ends 70 of the latches 64 are yieldably held in V-shaped notches 72 in the peripheries of the members 49, 50 by springs 74. In the event that the springs 56 should become broken or too weak to hold the members 49, 50 out of accidental engagement with the threaded member 10 the latches 64 will perform this function.

76 designates a plurality of auxiliary springs for coacting with the springs 56 in holding the members 49, 50 out of engagement with the threaded member 10. Said auxiliary springs 76 are interposed under compression between washers 78 and the heads 80 of rods 82 threaded in opposite sides of the housing 2 where they are further secured by lock nuts 84. The washers 78 are normally held by the springs 76 against shoulders 86 on the rods 82 but are free to be forced in the direction of the heads 80 in order to further compress the springs 76.

The internally threaded members 49, 50 are provided with tubular axial extensions 88 having bevel faces 90 engaging corresponding faces 92 on levers 94 and 95 loosely mounted upon the axle sections A. The levers 94 extend through slots 96 in the housings 2 and are connected to crank arms 98 through the intermediacy of connecting rods 100. The crank arms 98 are fixed to the frame of the motor vehicle. The rock shaft 102 also has a fixedly mounted crank arm 106 connected to a foot lever 108 by a connecting rod 110.

The levers 95 are connected to crank arms 112 through the intermediacy of connecting rods 114 and are fixedly mounted upon a rock shaft 116 journaled in bearings 118 carried by the frame of the vehicle. The rock shaft 116 is provided with an additional fixedly mounted crank arm 120 connected to a foot lever 122 through the intermediacy of a connecting bar 124. The foot levers 108 and 122 are arranged within convenient reach of the driver. The foot levers 108 and 122 are normally held in retracted positions by springs 126 and 128, respectively.

Should an emergency arise where it is desirable to quickly and positively stop the vehicle from forward movement, the foot lever 108 is pushed forwardly to simultaneously effect the forward movement of the levers 94, which operation causes the bevel faces 92 to rock on the bevel faces 90 on the extensions 88 and thus force the internally-threaded members 49 into engagement with the threaded members 10. As the threaded members 10 rotate with the axle sections A they will carry the members 49 inwardly until their lugs 53 are in the path of the associate lugs 55 on the brake drums 12, which are positively checked and in turn check the rotation of the axle sections A when the lugs 55 rotate into engagement with the lugs 53. As the members 49 are carried inwardly by the threaded members 10, as above stated, they will exert a retarding influence thereon due to the friction created on the engaging threads by the resistance of the springs 56 and 76 and thus materially reduce the shock incident to the lugs 55 contacting the lugs 53. After the forward movement of the vehicle has been checked and it is desired to again start the vehicle the same is first backed to disengage the lugs 55 from the lugs 53 and the internally threaded members 49 from the externally threaded members 10, which action is aided by the springs 56 and 76.

Should the vehicle start to run backwardly on a steep grade it may be checked by operating the foot lever 122, which in turn effects the operation of the levers 95 causing the same to throw the internally threaded members 50 into engagement with the threaded members 10 which carry said members 50 inwardly until the lugs 54 and 55ª engage, whereupon the rear axle sections A are positively locked and backward movement of the vehicle is effectually checked. When it is desired to disengage the lugs 54 from the lugs 55ª it is only necessary to drive the vehicle forward.

From the foregoing description it will be understood that I have provided a brake which may be employed to advantage for the triple purpose of a service brake, a brake to positively check forward and backward movement of the vehicle, and a brake to lock the vehicle against theft; and while I have shown and described the preferred construction, combination and arrangement of parts, I reserve the right to make such changes as properly fall within the spirit and scope of the appended claims.

Having thus described my invention, what I claim and desire to secure by Letters Patent, is:

1. In a brake mechanism, the combination with a rotary shaft, a member mounted to rotate with said shaft, an internally-threaded nonrotatable member mounted to move longitudinally of the shaft to frictionally engage and check the rotatable member, screw means mounted to rotate with the shaft and cause the internally-threaded nonrotatable member to engage and disengage the rotatable member, and manually controlled means for engaging the internally threaded nonrotatable member with said screw means.

2. In a brake mechanism, the combination with a rotary shaft, a member to rotate with said shaft, internally threaded nonrotatable members disposed at opposite sides of but normally free from the rotatable member, screw means fixed on the shaft to effect engagement of said nonrotatable members with the rotatable member to check the same, mechanism for engaging one of the nonrotatable members with said screw means when it is desired to check forward rotation of the rotatable member, and other mechanism for engaging the other nonrotatable member with the screw means when it is desired to check backward rotation of the rotatable member.

3. In a brake mechanism, the combination with a rotary shaft, a member to rotate with said shaft, a housing inclosing said rotary member, a member mounted in said housing and held thereby from rotation, screw means mounted upon the shaft and adapted to move the nonrotatable member into engagement with the rotatable member to check the same, a lever loosely mounted on the shaft to engage the nonrotatable member with said screw means, and manually-controlled mechanism for actuating said lever.

In testimony whereof I affix my signature, in the presence of two witnesses.

SAMUEL J. BECK.

Witnesses:
L. J. FISCHER,
F. C. FISCHER.